(12) United States Patent
Horio

(10) Patent No.: US 10,015,803 B2
(45) Date of Patent: Jul. 3, 2018

(54) CONTROL APPARATUS, CONTROL METHOD AND STORAGE MEDIUM

(71) Applicant: CANON KABUSHIKI KAISHA, Tokyo (JP)

(72) Inventor: Daisuke Horio, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 159 days.

(21) Appl. No.: 14/965,287

(22) Filed: Dec. 10, 2015

(65) Prior Publication Data

US 2016/0198483 A1    Jul. 7, 2016

(30) Foreign Application Priority Data

Jan. 6, 2015 (JP) ................................. 2015-001074

(51) Int. Cl.
*H04W 72/08* (2009.01)
*H04L 5/00* (2006.01)
*H04W 72/04* (2009.01)

(52) U.S. Cl.
CPC ......... *H04W 72/085* (2013.01); *H04L 5/0023* (2013.01); *H04W 72/046* (2013.01)

(58) Field of Classification Search
CPC .. H04W 72/085; H04W 72/046; H04L 5/0023
See application file for complete search history.

(56) References Cited

U.S. PATENT DOCUMENTS

| 8,238,318 B1* | 8/2012 | Negus | H04W 84/12 370/338 |
|---|---|---|---|
| 8,363,634 B2 | 1/2013 | Yamamoto et al. | |
| 2007/0286149 A1* | 12/2007 | Yamamoto | H04W 72/1263 370/345 |
| 2010/0220601 A1* | 9/2010 | Vermani | H04L 1/0025 370/248 |
| 2012/0044904 A1* | 2/2012 | Takano | H04W 72/046 370/329 |

FOREIGN PATENT DOCUMENTS

| JP | 2007329694 A | 12/2007 |
| JP | 2010263488 A | 11/2010 |

* cited by examiner

*Primary Examiner* — Mohammad Adhami
*Assistant Examiner* — Shailendra Kumar
(74) *Attorney, Agent, or Firm* — Rossi, Kimms & McDowell LLP

(57) ABSTRACT

A control apparatus that controls the communication period length of a signal transmitted by radio obtains the first radio quality regarding the first signal and the second radio quality regarding the second signal when spatially separating and transmitting the first signal and the second signal in parallel. The apparatus determines whether the first radio quality satisfies the first level for transmitting the first signal in the first communication period length and whether the second radio quality satisfies the second level for transmitting the second signal in the second communication period length. In a case where the first radio quality does not satisfy the first level or the second radio quality does not satisfy the second level, the apparatus extends the communication period length of a signal having a smaller communication period length.

18 Claims, 13 Drawing Sheets

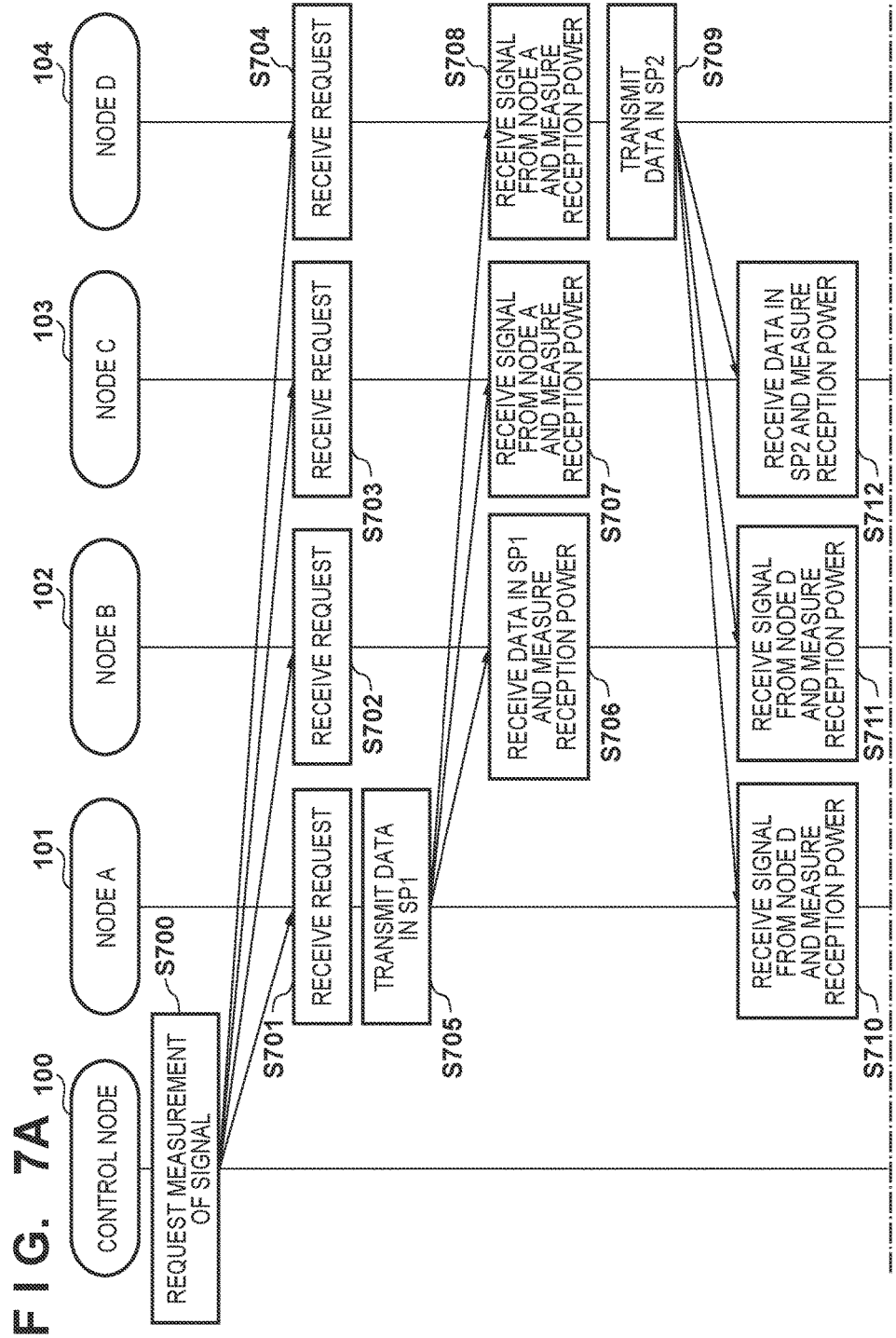

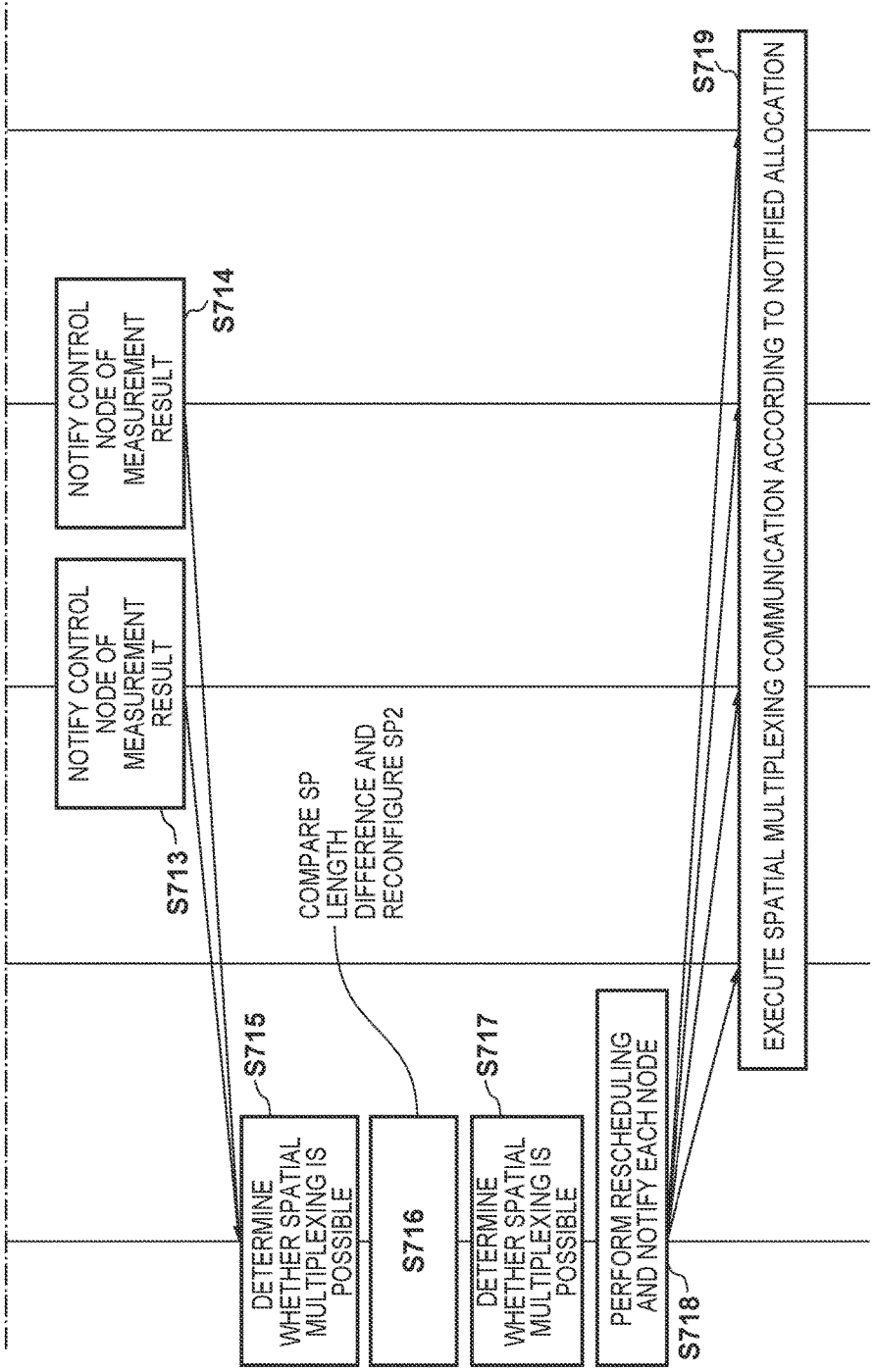

FIG. 10

| MODULATION SCHEME | NECESSARY SIR |
|---|---|
| BPSK | 5.6dB |
| QPSK | 8.6dB |
| 16QAM | 15.6dB |

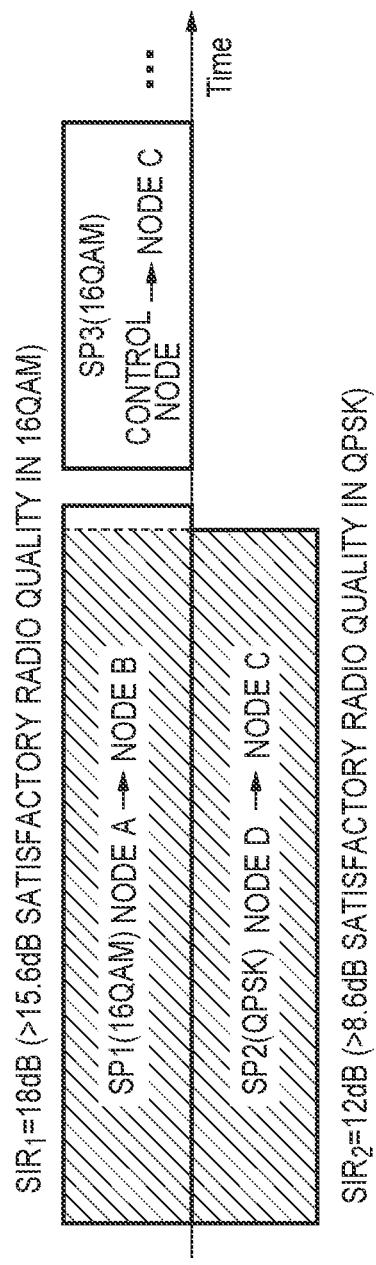

CONTROL APPARATUS, CONTROL METHOD AND STORAGE MEDIUM

BACKGROUND OF THE INVENTION

Field of the Invention

The present invention relates to a radio communication technique of performing spatial multiplexing.

Description of the Related Art

Recently, the capacity of data transmitted by a wireless network such as a home network or a public network is increasing, the wireless network is congested, and the communication band is tightened. As one means for solving the tightening of the communication band, the IEEE802.11ad standard defines execution of spatial multiplexing (spatial sharing). In spatial multiplexing, two or more pairs each of a transmission node and reception node having directional antennas perform communication in parallel by spatially separating communication links using the directivity characteristics of the antennas so as to satisfactorily reduce the interference between the communication links. Compared to a case in which spatial multiplexing is not performed, the time taken for data transmission can be shortened, and the frequency utilization efficiency of the overall radio communication system can be increased.

When two or more pairs each of a transmission node and reception node perform communication in parallel by spatial multiplexing, the communication period length may differ between the node pairs owing to the difference in the amount of data to be transmitted or the like. At this time, assuming that the communication period length of the first node pair is larger than that of the second node pair, if communication of the second node pair ends, even spatial multiplexing ends. The frequency utilization efficiency may be decreased by that amount.

To solve this problem, Japanese Patent Laid-Open No. 2007-329694 discloses a technique of dividing a communication frame having a large communication period length in accordance with the difference between this communication period length and a smallest communication period length among the communication period lengths of frames to undergo spatial multiplexing, and compensating for the difference in communication period length. Japanese Patent Laid-Open No. 2010-263488 discloses a technique of controlling signal frequency bandwidths used in respective frames in order to make the communication period lengths of the plurality of frames to undergo spatial multiplexing coincide with each other.

In Japanese Patent Laid-Open Nos. 2007-329694 and 2010-263488, the interference of a signal transmitted by the first pair of a transmission node and reception node with communication of the second pair of a transmission node and reception node is not taken into account. That is, Japanese Patent Laid-Open Nos. 2007-329694 and 2010-263488 only describe control of the communication period length on the premise that separation of communication links by the space has been completed. However, the separation performance of communication links by the space depends on the antenna characteristic, the positions of nodes, and the like. In some cases, a signal transmitted by one communication link may interfere with another communication link. In this case, communication by any communication link may fail, decreasing the frequency utilization efficiency.

The present invention increases the frequency utilization efficiency by effectively using the space and time resources based on the communication quality in a radio communication system that performs spatial multiplexing.

SUMMARY OF THE INVENTION

According to one aspect of the present invention, there is provided a control apparatus comprising: an obtaining unit configured to obtain a first radio quality regarding a first signal and a second radio quality regarding a second signal when spatially separating and transmitting the first signal of a first communication period length and the second signal of a second communication period length in parallel; a determination unit configured to determine whether the first radio quality satisfies a first level for transmitting the first signal in the first communication period length and whether the second radio quality satisfies a second level for transmitting the second signal in the second communication period length; and a control unit configured to, in at least one of a case in which the first radio quality does not satisfy the first level and a case in which the second radio quality does not satisfy the second level, perform control of extending the communication period length of a signal having a smaller communication period length out of the first signal and the second signal.

According to another aspect of the present invention, there is provided a control apparatus comprising: an obtaining unit configured to obtain a first radio quality regarding a first signal and a second radio quality regarding a second signal when spatially separating and transmitting the first signal and the second signal in parallel; and a control unit configured to control a first communication period length of the first signal and a second communication period length of the second signal so as to make the first radio quality satisfy a first level for transmitting the first signal, and the second radio quality satisfy a second level for transmitting the second signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 7A and 7B are sequence charts showing the sequence of processing of the radio communication system in operation example 1;

FIG. 10 is a table showing an example of a table in which a modulation scheme and an SIR necessary to use the modulation scheme are associated and stored;

FIG. 18 is a view showing an example of a case in which the transmission power of a signal regarding SP2 is lowered to improve the radio quality of a signal regarding SP1.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Arrangement of Radio Communication System)

Figure 1:
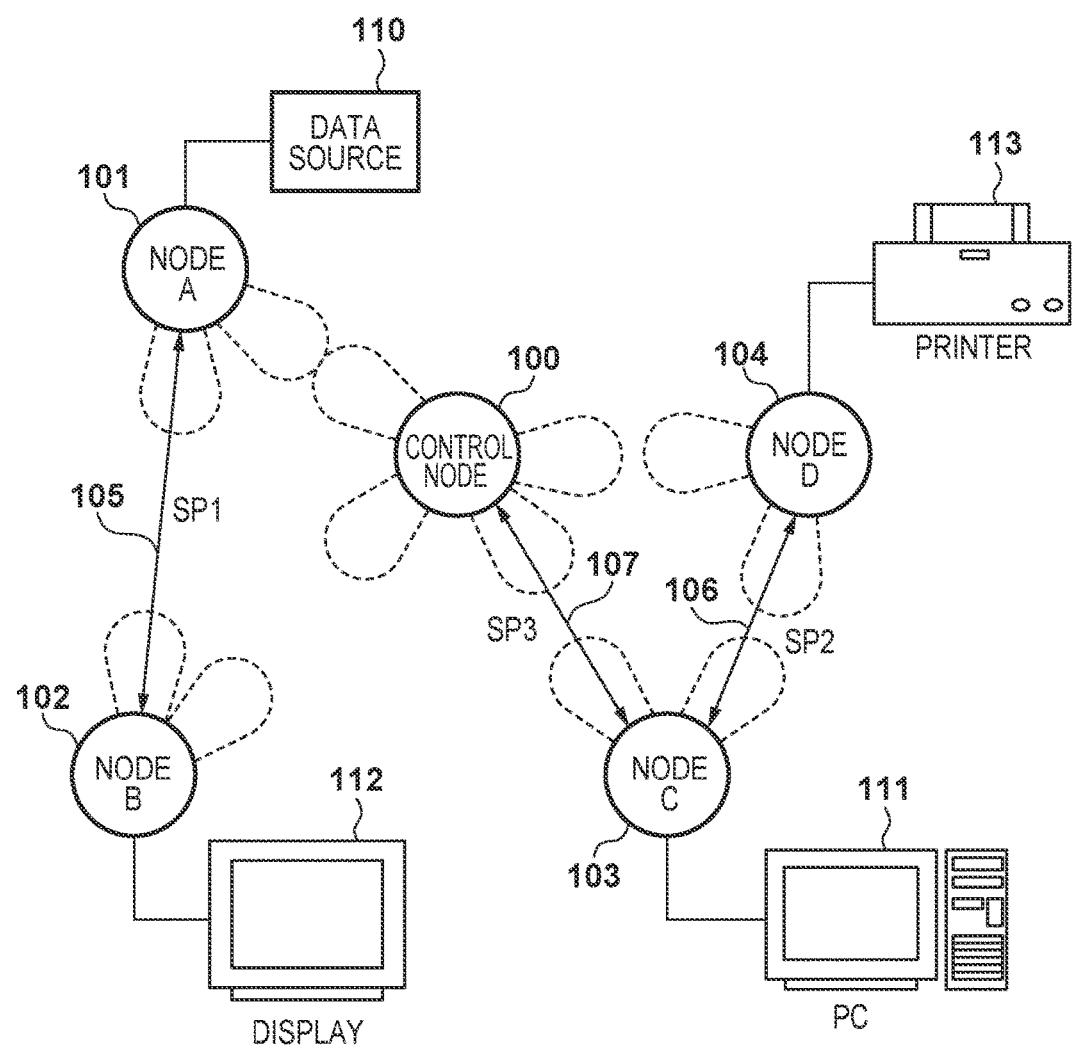
FIG. 1 is a view showing an example of the arrangement of a radio communication system.

FIG. 1 shows an example of the arrangement of a radio communication system according to an embodiment. The radio communication system in FIG. 1 includes, for example, one control node 100, and four nodes 101 to 104 each of which performs at least either transmission or reception of a signal. The control node 100 allocates communication periods SP1 to SP3 for performing transmission or reception of a signal by the four nodes 101 to 104 and the control node 100. SP stands for Service Period, but another symbol may be used as long as it indicates a predetermined communication period. That is, the control node 100 allocates communication periods that can be used by the respective nodes for transmission or reception of a signal. Note that the control node 100 may be not an independent node but a control apparatus incorporated in at least one of the four nodes 101 to 104. The control node 100 may be regarded as a node that performs at least either transmission or reception of a general signal, similar to the nodes 101 to 104, and has a function of performing control such as allocation of a communication period.

The nodes 101 to 104 and the control node 100 perform at least either transmission or reception of a data signal in the communication periods SP1 to SP3 allocated by the control node 100. In this example, the node A 101 radio-transmits an AV (Audio Video) content obtained from a data source 110 to the node B 102 by using a communication link 105 in the communication period SP1. The data source 110 connected to the node A 101 is, for example, a device such as a digital video camera, a hard disk, a digital video recorder, or a set-top box. A display 112 connected to the node B 102 displays a content received in the node B 102.

Similarly, in this example, the node C 103 is connected to a PC 111, and radio-transmits a text document, image data, or the like to the node D 104 connected to a printer 113 by using a communication link 106 in the communication period SP2. The control node 100 and the nodes 101 to 104 have directional antennas, and the interference generated between the communication links 105 and 106 can be suppressed by the directivity characteristics of the directional antennas. Note that the directional antenna may be an antenna with fixed directivity characteristics such as a parabolic antenna, or an antenna with variable directivity characteristics such as an array antenna that controls, for example, the phase and amplitude of a transmission signal or reception signal in a plurality of antenna elements. The antenna with variable directivity characteristics can obtain a high gain in the direction of directivity and suppress the interference in the direction of non-directivity by, for example, narrowing the beam width of the main lobe of the antenna. For example, when the respective communication links can be spatially separated and the amount of interference between them can be suppressed satisfactorily small, the control node 100 can make the communication periods SP1 to SP3 overlap each other and perform transmission and reception of signals in the respective communication links in parallel.

Figure 2:
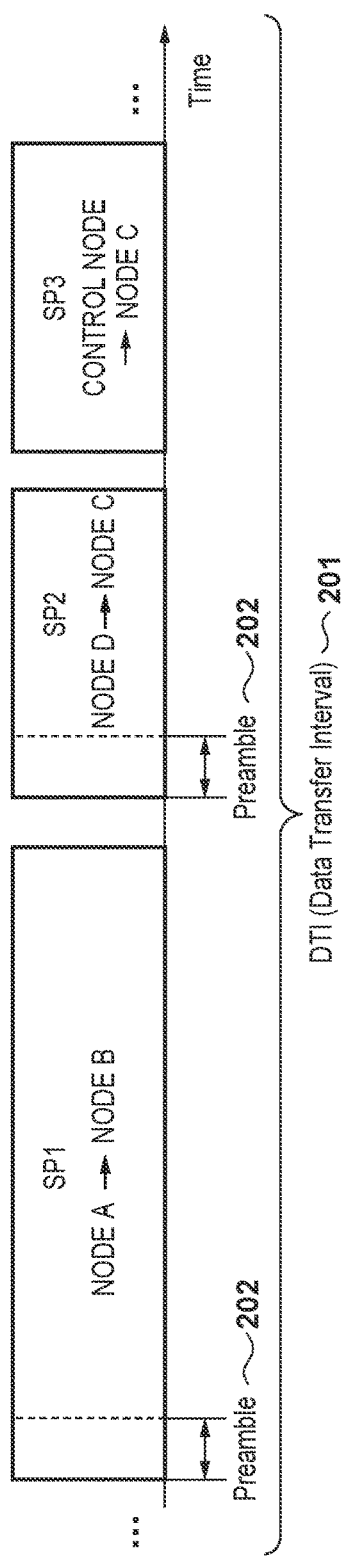
FIG. 2 is a view showing an example of how to allocate communication periods when no spatial multiplexing is performed.

FIG. 2 shows an example of how to allocate communication periods when no spatial multiplexing is performed. The control node 100 allocates the communication periods SP1 to SP3 in a DTI (Data Transfer Interval) 201 serving as a communication period of the TDMA (Time Division Multiple Access) scheme. More specifically, the communication periods SP1 to SP3 are ensured not to temporally overlap each other, and allocated to, for example, different pairs each of a transmission node and reception node. In the example of FIG. 2, SP1 is allocated to a communication link having the node A 101 as a transmission node and the node B 102 as a reception node, and SP2 is allocated to a communication link having the node D 104 as a transmission node and the node C 103 as a reception node. Also, SP3 is allocated to a communication link having the control node 100 as a transmission node and the node C 103 as a reception node.

The nodes 101 to 104 perform data communication according to the communication periods SP1 to SP3 allocated by the control node 100. The control node 100 can notify the nodes 101 to 104 of SP allocation information in the DTI 201 by using a beacon or a specific frame. The control node 100 may broadcast the nodes of the allocation information, or individually notify them of the allocation information. Although the nodes 101 to 104 may perform two-way data communication in SP1 to SP3 allocated by the control node 100, a case in which one-way data communication is performed will be explained in the embodiment for convenience.

Note that each communication period includes a preamble period 202 for reception power level adjustment or synchronization acquisition. For example, reception power measurement of a signal (to be described later) can be performed in the preamble period 202. Note that FIG. 2 does not explicitly show a preamble period in SP3, but SP3 may also have a preamble period. It is unnecessary that the preamble period always exists in some or all signals such as a signal from the control node 100. That is, for example, when reception power level adjustment, synchronization acquisition, or the like can be performed even without the preamble period, the preamble period may be omitted. Instead of the preamble period, a predetermined single symbol or symbol sequence or the like in a signal for performing reception power level adjustment, synchronization acquisition, or the like may be used. Even in this case, for example, a reception node measures a desired signal in a communication period allocated to the reception node, and measures an interference signal in a communication period allocated to another node. Accordingly, each node can obtain a radio quality at the time of receiving a signal.

An example of allocation of communication periods, interference, and a free resource at the time of spatial multiplexing will be explained with reference to FIG. 3. At the time of spatial multiplexing, the node B 102 serving as a reception node to which the communication period SP1 is allocated sometimes receives interference 300 from a radio signal transmitted by the node D 104 in a period corresponding to SP2. The node C 103 serving as a reception node to which SP2 is allocated sometimes receives interference 301 from a radio signal transmitted by the node A 101 in the entire period SP2. If any of radio qualities in reception nodes does not satisfy a predetermined level owing to the interference, communication in a communication link in which the predetermined level is not satisfied fails, and the communication link may serve as an interference source. As a result, spatial multiplexing may rather decrease the frequency utilization efficiency.

Figure 3:
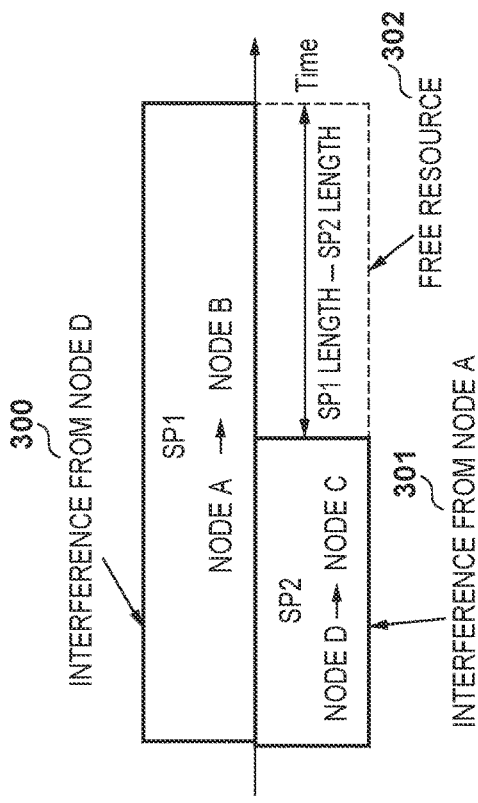
FIG. 3 is a view showing an example of allocation of communication periods, interference, and a free resource at the time of spatial multiplexing.

Since SP1 and SP2 are different in communication period length and the communication period length of SP2 is smaller, a free resource 302 of a period (SP1 length−SP2 length) is generated, as shown in FIG. 3. Since a communication link in which communication is performed in parallel to SP1 does not exist in the free resource 302, the frequency utilization efficiency improvement effect by spatial multiplexing may be restrictive.

In the embodiment, the control node 100 performs the following processing in order to prevent the decrease in the frequency utilization efficiency improvement effect. That is, the control node 100 obtains the first radio quality of the first signal and the second radio quality of the second signal when spatially separating and transmitting the first signal of the first communication period length (for example, SP1) and the second signal of the second communication period length (for example, SP2) in parallel. Then, the control node 100 determines whether the first radio quality and the second radio quality respectively satisfy the first level for transmitting the first signal in the first communication period length, and the second level for transmitting the second signal in the second communication period length. If at least either of the first radio quality and second radio quality does not satisfy a corresponding one of the first level and second level, the control node 100 performs control to extend the smaller communication period length.

For example, when the first communication period length is larger than the second communication period length and the second radio quality does not satisfy the second level, the second communication period length is extended. This can enhance the redundancy of the second signal and allow for communication of the second signal. For example, the second level regarding the second signal can be lowered by extending the second communication period length, and changing the modulation scheme of the second signal to a modulation scheme in which the modulation level is lower and the SIR (Signal to Interference power Ratio) tolerance is enhanced. Similarly, by decreasing the coding rate of the error correction code of the second signal, the SIR tolerance is enhanced, and the second level regarding the second signal can be lowered. At this time, the amount of data transmitted by the second signal can be kept constant.

When the first communication period length is larger than the second communication period length and the first radio quality does not satisfy the first level, the second communication period length is extended. For example, since the SIR tolerance of the second signal can be increased as described above, the transmission power of the second signal can be decreased by the increase in tolerance. As a result, the amount of interference with the first signal is suppressed, so the radio quality regarding the first signal can be improved, and the first and second signals can be spatially separated and transmitted in parallel.

Further, the technique according to the embodiment is applicable not only to a case in which communication of the first and second signals is continuously performed and the relationship between their communication period lengths is set, but also to a case in which the relationship between their communication period lengths is not set. That is, the technique according to the embodiment is applicable to even a case in which the communication period length is not known in advance, for example, a case in which the amount of data transmitted by each signal is not constant or a case in which communication of at least one of a plurality of signals occurs for the first time. For example, a smallest communication period length for each signal is calculated based on the transmission data amount of each signal or the like, and a radio quality obtained in accordance with a predetermined signal such as a beacon or a reference signal. Based on the calculated smallest communication period length, the communication period length is extended in regard to a signal having a smaller communication period length by the same method as that when the relationship in communication period length between the signals is set, thereby determining a final communication period length. It is also possible to prepare a table that specifies a combination of a modulation scheme and coding scheme to be used or the like from the relationship with a radio quality in each reception node, and after determining a modulation scheme or the like based on the table, set a communication period length based on the determination result. It is also possible to prepare a table that directly specifies a communication period length from the relationship between the radio quality and the amount of data that should be transmitted in each signal. These methods and other methods will be described in detail later.

(Arrangement of Control Node)

Figure 4:
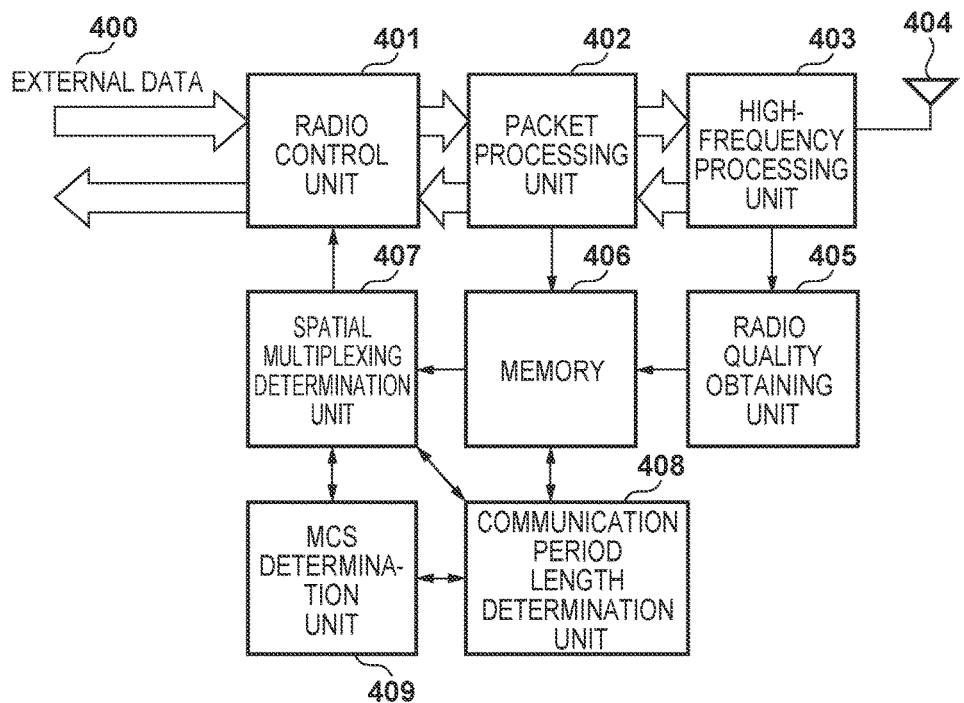
FIG. 4 is a block diagram showing an example of the arrangement of a control node.

Subsequently, an example of the arrangement of the control node 100 according to the embodiment will be explained with reference to FIG. 4. The control node 100 includes, for example, a radio control unit 401, a packet processing unit 402, a high-frequency processing unit 403, an antenna 404, a radio quality obtaining unit 405, a memory 406, a spatial multiplexing determination unit 407, a communication period length determination unit 408, and an MCS determination unit 409. These functional units may be implemented by individual hardware components in the control node 100, or implemented by executing programs stored in a memory such as a RAM or a ROM by an ASIC, or one or more processors such as a CPU. FIG. 4 shows merely an example, and each functional block may be divided into two or more blocks, or two or more functional blocks may be integrated to form one functional block.

The radio control unit 401 of the control node 100 obtains, as external data 400, data such as an AV content or a file. In the embodiment, the control node 100 is not connected to a device and does not communicate such data. However, when the control node 100 is connected to a device or incorporated in a device, the radio control unit 401 can obtain data in order to transmit data to be transferred from the device to a communication partner, or receive data to be obtained from a communication partner. That is, the control node 100 can function as a transmission node or reception node that performs not only communication control but also data communication.

Even when the external data 400 does not exist, the radio control unit 401 generates a control frame including information such as allocation information of each SP in the DTI 201, or a modulation scheme used by the nodes 101 to 104 for communication. The generated control frame is input to the packet processing unit 402. Note that when the radio control unit 401 receives, from the packet processing unit 402, a control frame received from another node, the radio control unit 401 controls itself so as to perform processing corresponding to the control frame, or transfers data in the control frame to another functional block. For example, when a frame including the external data 400 that is addressed to a device including the control node 100 and received from another apparatus is input from the packet processing unit 402, the radio control unit 401 outputs the external data 400.

The packet processing unit 402 converts input data into radio packets, and performs coding, modulation processing, and the like to generate a radio signal. For example, the packet processing unit 402 performs error correction coding on data, then performs primary modulation, and performs serial parallel conversion and inverse Fourier transform to generate a signal of the OFDM (Orthogonal Frequency Division Multiplexing) format. The packet processing unit 402 may generate not a signal of the OFDM format but a signal of the time division multiplexing format by multiplying a signal after primary modulation by a diffuse series. Alternatively, the packet processing unit 402 may generate a signal of another format such as a signal of the time division multiplexing format including a signal after primary modulation without change. Further, the packet processing unit 402 may generate a signal of a single carrier by performing Fourier transform on a signal after primary modulation, mapping a series of Fourier transform results as a signal to be transmitted by a subcarrier, and performing inverse Fourier transform.

When data addressed to a device including the control node 100 or connected to the control node 100 is received, the packet processing unit 402 performs processing reverse to each process described above. For example, the packet processing unit 402 performs Fourier transform on a signal received by the OFDM format, performs parallel serial conversion, and then performs primary demodulation to extract data.

In general, the error correction code can be used to evaluate the tolerance to degradation of the radio quality such SIR based on a coding rate represented by a value obtained by dividing an original data length by a data length after error correction coding. That is, as the original data length is closer to the data length after error correction coding and the coding rate is closer to 1, the tolerance to degradation of the radio quality becomes lower. The tolerance to degradation of the radio quality can be enhanced by decreasing the coding rate conversely. The adjustment of the coding rate may be performed by changing the scheme of error correction coding itself or by missing (puncturing) part of an output series while using the same coding method.

Primary modulation uses, for example, BPSK (Binary Phase Shift Keying (PSK)), QPSK (Quadrature PSK), or 16QAM (16 Quadrature Amplitude Modulation). In the primary modulation scheme, the modulation level increases as the number of signal points in the signal space is larger. That is, the numbers of signal points in the signal space are 2, 4, and 16 (1, 2, and 4 bits can be transmitted by one symbol, respectively) in BPSK, QPSK, and 16QAM, respectively. The modulation level becomes higher in the order of BPSK, QPSK, and 16QAM. As the modulation level is higher, the tolerance to degradation of the radio quality such as SIR becomes lower. The tolerance to degradation of the radio quality can be enhanced by decreasing the modulation level conversely.

The high-frequency processing unit 403 forms a radio signal by performing up-conversion of a radio packet generated by the packet processing unit 402 into a desired radio frequency. The radio signal is transmitted from the directional antenna 404.

The antenna 404 is, for example, an array antenna that obtains desired directivity characteristics by controlling the phase and amplitude of a signal transmitted or received by a plurality of antenna elements. The antenna 404 may be an antenna unit in which a plurality of antennas with fixed directivity characteristics are prepared and switched by a switch or the like to change the directivity characteristics. Further, the antenna 404 may be one antenna with fixed directivity characteristics when communicating with only a specific partner apparatus.

The radio quality obtaining unit 405 obtains, for example, the measurement value of a reception power in each reception node at a preamble portion in each SP allocated when no spatial multiplexing is performed, as shown in FIG. 2. Note that SPs when no spatial multiplexing is performed are allocated so that signals regarding the respective SPs do not interfere with each other, so the communication period length is regarded as a communication period length taken to transmit data when no interference exists. That is, when the interference exists, it degrades the communication quality. Thus, even when transmitting the same amount of data, redundancy for compensating for degradation of the communication quality is added, and the communication period length may be prolonged. However, the measurement result of a signal in SP allocated on condition that no interference exists is obtained as a criterion for, for example, evaluation of the possibility of subsequent spatial multiplexing. Note that when the control node 100 itself performs data communication (especially, reception), the radio quality obtaining unit 405 can also obtain the reception power of a signal by signal measurement in the control node 100 itself. This method is effective particularly when data corresponding to each SP is continuously transmitted at a predetermined transmission rate. That is, the report of a measurement result particularly becomes significant not when there is no data to be transmitted after performing communication by SP allocation as shown in FIG. 2, but when data transmission is continuously performed even after that. For example, when the technique according to the embodiment is used in communication between fixed home electronic devices, the interference state in each communication device is considered not to greatly change as long as the directivity characteristics of the antenna are constant. In such a case, even if data to be transmitted does not exist immediately after communication by SP allocation as shown in FIG. 2, the above-mentioned measurement result can be exploited at the time of next data transmission.

Before allocating SP, the radio quality obtaining unit 405 may obtain the result of measuring, in each node, the reception power of a predetermined signal (for example, reference signal or beacon) transmitted (for example, periodically) by each node. This method is effective not when data corresponding to each SP is continuously transmitted at a predetermined transmission rate, but when the positional relationship of each node or the like is variable. That is, the radio quality is evaluated by measuring a predetermined signal prior to communication. By doing so, when a single communication request is received, the radio quality can be known in advance without actually executing the communication. According to this method, a communication resource is used for transmission of a predetermined signal, whereas it can be prevented to generate a communication period in which no spatial multiplexing is performed, as shown in FIG. 2.

The radio quality obtaining unit 405 obtains information about the above-mentioned measurement value by, for example, receiving a report from each reception node via the antenna 404 and the high-frequency processing unit 403. The radio quality obtaining unit 405 obtains by calculation a radio quality when performing spatial separation (multiplexing) and parallel communication in each reception node in the communication period SP1 or SP2 allocated to the reception node. The obtained radio quality is associated with each SP and stored in the memory 406.

Instead of obtaining the measurement result of a signal from each node and obtaining a radio quality by calculation in the radio quality obtaining unit 405, each node may calculate a radio quality based on the signal measurement result of the node, and transmit the calculation result to the control node 100. In any case, the radio quality obtaining unit 405 can obtain the radio quality of a signal received in each reception node. The radio quality is, for example, SIR (Signal to Interference power Ratio), but may be SINR (Signal to Interference and Noise power Ratio), CIR (Carrier to Interference power Ratio), CINR (Carrier to Interference and Noise power Ratio), SNR (Signal to Noise power Ratio), CNR (Carrier to Noise power Ratio), or the like. The detailed definition and calculation method of the radio quality used in the embodiment will be described later.

The memory 406 stores a radio quality in each SP as described above, and also stores information of the communication period length of each SP together with a corresponding SP. The information of the communication period length is used when determining an SP arrangement in the DTI 201, or when comparing the communication period lengths of signals to undergo spatial multiplexing. The memory 406 may store a table in which a necessary SIR is associated with at least either of the modulation scheme and coding rate used in the control node 100 and the nodes 101 to 104. This table can be looked up as an index when performing spatial multiplexing.

The spatial multiplexing determination unit 407 compares a radio quality obtained by the radio quality obtaining unit 405 with the table stored in the memory 406, and determines, from a communication period length comparison result in the communication period length determination unit 408, whether spatial multiplexing is possible.

For example, the spatial multiplexing determination unit 407 determines whether the first radio quality corresponding to SP1 satisfies the first level for transmitting/receiving the first data amount in SP1 at the time of spatial multiplexing with a signal corresponding to SP2. Also, the spatial multiplexing determination unit 407 determines whether the second radio quality corresponding to SP2 satisfies the second level for transmitting/receiving the second data amount in SP2 at the time of spatial multiplexing with a signal corresponding to SP1. When the first radio quality satisfies the first level and the second radio quality satisfies the second level, the spatial multiplexing determination unit 407 determines that two signals corresponding to SP1 and SP2 can be transmitted/received in parallel by spatial multiplexing.

In at least either a case in which the first radio quality does not satisfy the first level or a case in which the second radio quality does not satisfy the second level, the spatial multiplexing determination unit 407 determines whether spatial multiplexing becomes possible by extending the communication period length of a signal having a smaller communication period length. For example, when the communication period length of SP1 is larger than that of SP2, the spatial multiplexing determination unit 407 determines whether a signal in which the radio quality does not satisfy a level can satisfy a predetermined level by extending the communication period length of SP2.

More specifically, for example, when the second radio quality does not satisfy the second level, the spatial multiplexing determination unit 407 determines whether, by extending the communication period length of SP2, the second radio quality will satisfy the third level for transmitting the same amount of data in the extended communication period length. If the communication period length is extended, for example, at least part of the same signal can be copied and transmitted a plurality of times. For example, assuming that one entire signal can be copied and transmitted twice, a 3-dB gain can be obtained, and the third level can be set to a value lowered by about 3 dB from the second level. When the communication period length is extended, at least either of the modulation level and coding rate can be lowered even in transmitting the same amount of data. As a result, the third level of the radio quality corresponding to the changed modulation level and coding rate can be obtained. At this time, the third level becomes lower than the second level in response to lowering at least either of the modulation level and coding rate. When the second radio quality satisfies the third level, the spatial multiplexing determination unit 407 can determine that spatial multiplexing is possible.

Even when the first radio quality does not satisfy the first level, the spatial multiplexing determination unit 407 determines whether the first radio quality can satisfy the first level by extending the communication period length of SP2. In this case, the interference amount of a signal regarding SP2 with respect to a signal regarding SP1 is reduced by lowering the transmission power of a signal regarding SP2 as long as the second radio quality satisfies the third level for transmitting the same amount of data in the extended communication period length. Accordingly, the SIR of a signal regarding SP1 is improved and the first radio quality satisfies the first level in some cases. Hence, when the first radio quality satisfies the first level by extending the communication period length of SP2 and lowering the transmission power of a signal, the spatial multiplexing determination unit 407 can determine that spatial multiplexing is possible.

Note that the above-described methods can also be used in combination. The communication period length after extending SP2 can be set in the range of smaller than the communication period length of SP1 or the range of smaller than the total length of the communication period lengths of SP1 and SP2. Even in either case, communication can be performed in a short period, compared to a case in which no spatial multiplexing is performed, and the frequency utilization efficiency can be increased. When the length of SP2 after extension is extended in the range of smaller than the total length of the communication period lengths of SP1 and SP2, the communication period length of SP1 can also be extended in the range of smaller than the total length. Since the redundancy of SP1 is enhanced, it becomes only necessary that the first communication quality satisfies the fourth level after extending the communication period length. As a consequence, the probability that spatial multiplexing becomes possible can be increased. The second radio quality can also be improved by lowering even the transmission power of a signal regarding SP1 as long as the fourth level is satisfied.

In each method described above, it is also possible to specify at least one of the number of times of repetition of data or the range, and a selected modulation level and coding rate, and set the extended communication period length of SP2, instead of setting first the extended communication period length of SP2. That is, it is also possible to specify a level at which the second radio quality becomes satisfactory, select at least one of the number of times of repetition of data or the range, the modulation level, and the coding rate in accordance with the level, and set the extended communication period length of SP2 in accordance with the selection result. In this case, when the communication period length is smaller than the communication period length of SP1 (or is smaller than the total length of the communication period lengths of SP1 and SP2), the spatial multiplexing determination unit 407 may determine that spatial multiplexing is possible.

The spatial multiplexing determination unit 407 may compare the communication period lengths of SP1 and SP2, and determine, depending on whether the difference between these communication period lengths is equal to or larger than a predetermined length, whether spatial multiplexing becomes possible by extending the communication period length. That is, when the difference between the communication period lengths is equal to or larger than the predetermined length, the effect of extending the communication period length of a signal having a smaller communication period length is obtained. However, when this difference is smaller than the predetermined length, the effect is considered to be little. Therefore, when the difference between the communication period lengths is smaller than the predetermined length, the spatial multiplexing determination unit 407 may determine only whether each radio quality satisfies a corresponding level for communication even without extending the communication period length.

When a communication period length has already been set in regard to a signal serving as a candidate of the spatial multiplexing target, the communication period length determination unit 408 obtains the communication period length by referring to the memory 406, and notifies the spatial multiplexing determination unit 407 of it. The communication period length determination unit 408 compares communication period lengths. In response to a request from the spatial multiplexing determination unit 407, the communication period length determination unit 408 determines a communication period length when extending a smaller communication period length, and notifies the spatial multiplexing determination unit 407 of the determined extended communication period length. In accordance with the selection of at least either of a modulation level and coding rate regarding the modulation scheme by the MCS determination unit 409, the communication period length determination unit 408 determines an extended communication period length used when transmitting the same amount of data. In the above description, the spatial multiplexing determination unit 407 compares communication period lengths, and can determine, depending on whether the difference between the communication period lengths is equal to or larger than a predetermined length, whether spatial multiplexing becomes possible by extending the communication period length. However, the communication period length determination unit 408 may perform the comparison and the difference calculation. In this case, the communication period length determination unit 408 transfers information about the difference to the spatial multiplexing determination unit 407. Note that the communication period length determination unit 408 may notify the spatial multiplexing determination unit 407 of this information as information representing whether to determine whether spatial multiplexing becomes possible by extending the communication period length. That is, the communication period length determination unit 408 may determine whether the difference between the communication period lengths is equal to or larger than a predetermined length.

For example, in response to a request from the spatial multiplexing determination unit 407, the MCS determination unit 409 determines at least either of a modulation scheme (modulation level) and coding scheme (coding rate) necessary to satisfy a radio quality of a predetermined level. Note that MCS stands for Modulation and Coding Scheme, and indicates a combination of a modulation scheme and coding scheme. The MCS may be one defined by a wireless LAN standard (for example, the IEEE802.11ad standard). Although the term "MCS" is used in this embodiment for convenience, another element capable of changing the SIR tolerance by changing the format of a signal such as the modulation scheme or the coding rate may be used. For example, when diffusing a signal by a code, the diffusivity may be used instead of the MCS. The MCS determination unit 409 notifies the communication period length determination unit 408 and the spatial multiplexing determination unit 407 of at least either of the determined modulation scheme (modulation level) and coding scheme (coding rate). Note that the communication period length determination unit 408 and the MCS determination unit 409 may function as part of the spatial multiplexing determination unit 407. When neither the modulation scheme (modulation level) nor the coding scheme (coding rate) is changed in extending the communication period length (for example, when repetitively transmitting a copy of at least part of a transmission signal), the MCS determination unit 409 may be omitted.

When the radio quality obtaining unit 405 obtains a radio quality based on a predetermined signal such as a reference signal or a beacon, this means that there is no communication period length set in advance. In this case, the spatial multiplexing determination unit 407, the communication period length determination unit 408, and the MCS determination unit 409 can set communication period lengths regarding the first and second signals based on a radio quality obtained when spatially separating and transmitting the first and second signals in parallel. In this case, for example, the communication period lengths of the first and second signals are determined so that the first radio quality obtained for the first signal satisfies the first level and the second radio quality obtained for the second signal satisfies the second level. Note that a table in which a communication period length, modulation scheme, and the like are associated and stored for each combination of a data size and radio quality can be used in the determination of the communication period length. In the determination of the communication period length, first, a smallest communication period length corresponding to a radio quality and the size of data to be transmitted by a signal can be set for each reception node. In this case, when the radio quality of any signal does not satisfy a corresponding level based on the smallest communication period length, the communication period length for a signal having a smaller communication period length is extended by the same method as each method described above, thereby satisfying the level. In this manner, the communication period length of each signal is determined so that each signal satisfies a predetermined level of a corresponding radio quality. Note that the communication period length at this time may be determined to be smaller than the total length of the above-mentioned smallest communication period lengths. When the communication period length is equal to or larger than the total length, it may be determined that spatial multiplexing is impossible.

Note that the nodes 101 to 104 that perform communication are notified of information for controlling a signal to be transmitted, such as information of a communication period length determined by the communication period length determination unit 408, and a modulation scheme and coding scheme which are determined by the MCS determination unit 409 and are to be used. This notification is sent by radio via, for example, the radio control unit 401, the packet processing unit 402, the high-frequency processing unit 403, and the antenna 404. When the control node 100 itself performs data communication, a signal for the data communication is formed using a determined communication period length, modulation scheme, and coding scheme. To achieve this, a control signal including these determined pieces of information is input to, for example, the packet processing unit 402.

(Arrangement of Node Other than Control Node)

Figure 5:
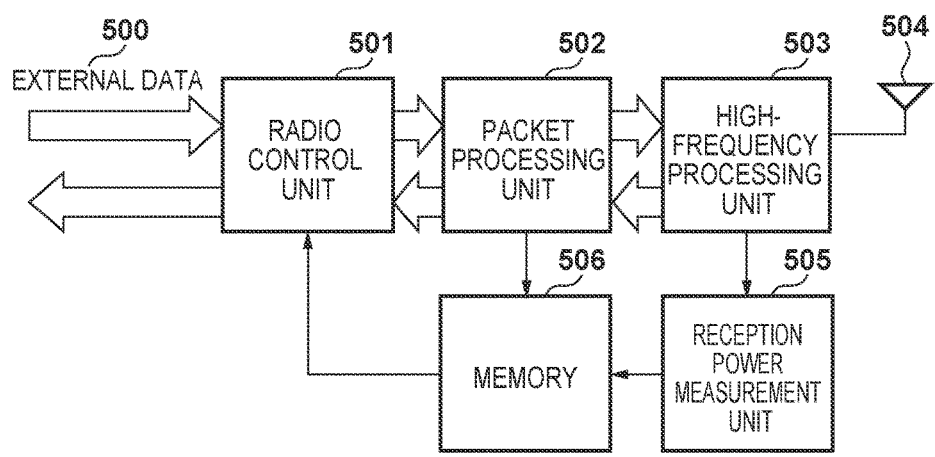
FIG. 5 is a block diagram showing an example of the arrangement of a node other than the control node.

Subsequently, an example of the arrangement of the nodes 101 to 104 other than the control node 100 will be explained with reference to FIG. 5. When one of the nodes 101 to 104 operates as the control node 100, this node has the arrangement as shown in FIG. 4. Each of the nodes 101 to 104 includes, for example, a radio control unit 501, a packet processing unit 502, a high-frequency processing unit 503, an antenna 504, a reception power measurement unit 505, and a memory 506. These functional units may be implemented by individual hardware components in each of the nodes 101 to 104, or implemented by executing programs stored in a memory such as a RAM or a ROM by an ASIC, or one or more processors such as a CPU. FIG. 5 shows merely an example, and each functional block may be divided into two or more blocks, or two or more functional blocks may be integrated to form one functional block.

The radio control unit 501, the packet processing unit 502, the high-frequency processing unit 503, and the antenna 504 are the same as the functional blocks of the same names in the control node 100. However, since the control node 100 performs overall SP allocation in the DTI 201, the radio control unit 501 interprets, from a control frame from the control node 100, control information such as the data communication timing and modulation scheme in SP of the node, and operates. The reception power measurement unit 505 measures the reception power of a signal transmitted by a node functioning as a transmission node out of the control node 100 and the nodes 101 to 104 in each SP. The measurement result is stored in the memory 506, and the control node 100 is notified of the measurement result via the radio control unit 501, the packet processing unit 502, the high-frequency processing unit 503, and the antenna 504. Note that the reception power measurement unit 505 may obtain, by calculation based on the measurement results of the reception powers of signals from respective transmission nodes, a radio quality when spatially separating and transmitting the signals in parallel. In this case, the control node 100 can be notified of the obtained radio quality information. Note that the control node 100 may be notified of both the radio quality information and the measurement value of the reception power.

Subsequently, the operations of the control node 100 and the nodes 101 to 104 each functioning as a transmission node or a reception node will be explained using several examples.

Operation Example 1

Figure 6:
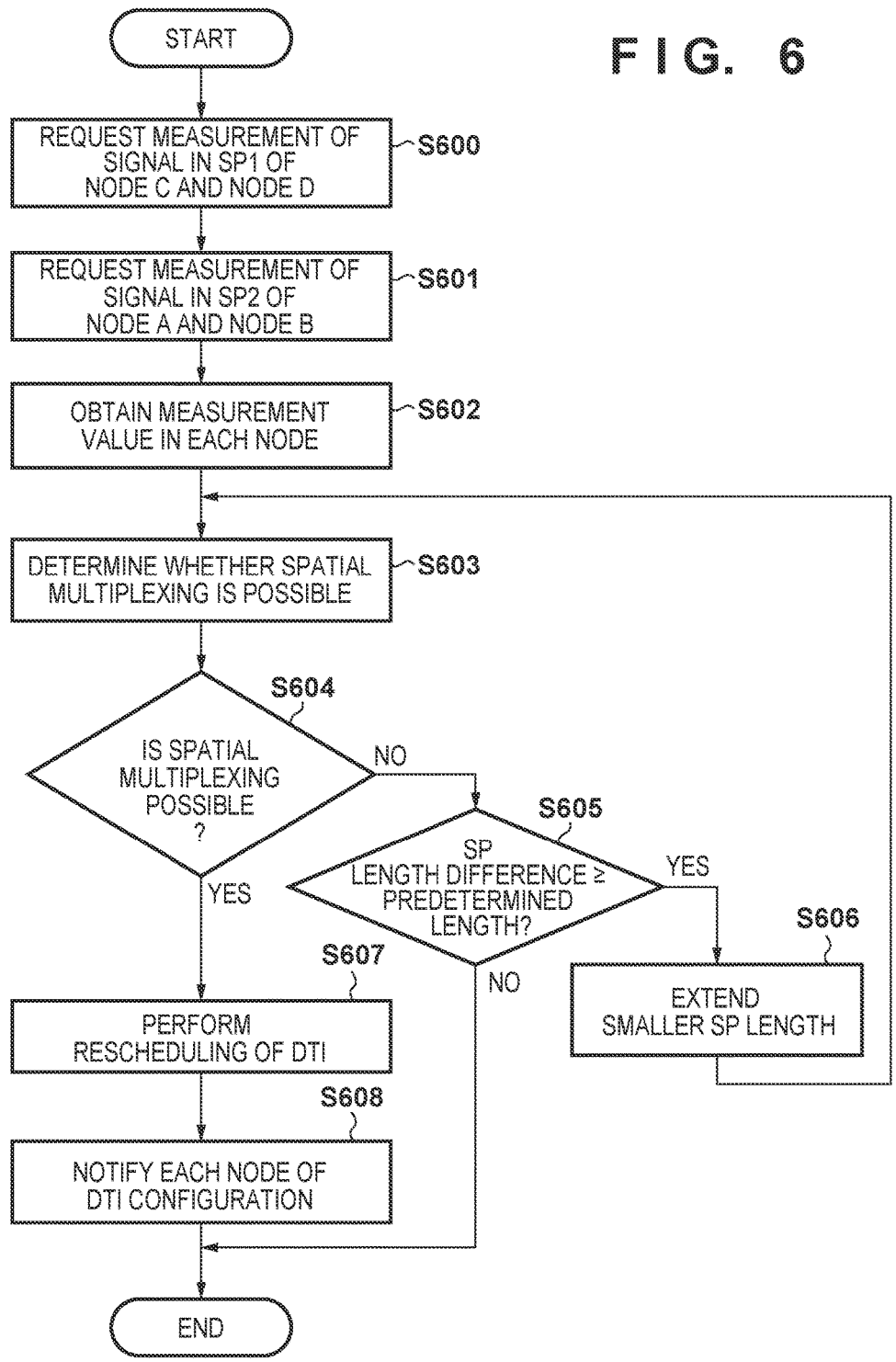
FIG. 6 is a flowchart showing the sequence of processing by the control node in operation example 1.

FIG. 6 is a flowchart showing the sequence of processing to be executed by the control node 100 in operation example 1. First, the control node 100 requests measurement of a signal of each node in order to collect information for determining whether spatial multiplexing can be executed (steps S600 and S601). That is, the control node 100 requests measurement of the reception power of a transmission node and a reception node in SP1 and SP2 that are arranged not to temporally overlap each other in a given DTI 201. Note that a measurement request regarding SP1 may not be issued to, for example, the transmission node and reception node of a signal regarding SP1. This is because the transmission node of a signal regarding SP1 cannot measure a signal to be transmitted by the transmission node, and the reception node of a signal regarding SP1 measures the signal (for example, by channel estimation) even without a request. In SP1, therefore, the control node 100 requests measurement of a radio signal of the node C 103 and node D 104 to which SP2 is allocated (step S600). Similarly, in SP2, the control node 100 requests measurement of a radio signal of the node A 101 and node B 102 to which SP1 is allocated (step S601).

Note that these requests may be issued at once. That is, all nodes associated with SP1 and SP2 may be notified by one signal of requests for measurement of radio signals in SP1 and SP2. This signal may be broadcast. In this case, the nodes associated with SP1 and SP2 accept measurement requests by receiving this signal. To the contrary, nodes not associated with SP1 and SP2 can ignore this signal. When transmitting a predetermined signal such as a reference signal or a beacon from each node, the node may measure a predetermined signal transmitted by another node, and upon accepting a request, notify the control node 100 of previous measurement results. Note that the predetermined signal such as a reference signal or a beacon can include specifying information for specifying a transmission source node, and a notification to the control node 100 can include information representing a node from which a signal has been received, and the reception power of the signal. Note that the predetermined signal such as a reference signal or a beacon may include information representing a reception node to which a signal is directed. In this case, a notification to the control node 100 can include information representing nodes from and to which a signal has been received, and the reception power of the signal.

The control node 100 obtains the measurement results of radio signals in the nodes 101 to 104 (step S602). The measurement results include, for example, the results of measuring, by the node B 102, the node C 103, and the node D 104, the reception power of a radio signal transmitted by the node A 101 in SP1. The measurement results also include, for example, the results of measuring, by the node C 103, the node A 101, and the node B 102, the reception power of a radio signal transmitted by the node D 104 in SP2. The nodes that have performed measurement notify the control node 100 of these measurement results by, for example, radio signals. Note that the nodes that have performed measurement may notify the control node 100 of the measurement results of the reception powers of radio signals, or information of radio qualities obtained from these measurement results.

A method of calculating a radio quality from the measurement result of the reception power of a radio signal will be explained here. The above-described reception power measurement results are classified into a desired signal level serving as a reception power when a signal from a transmission node is received in a reception node serving as the destination of the signal, and an interference signal level serving as a reception power when the signal is received in a node other than the destination node. That is, in SP1, the node A 101 transmits a radio signal, so a reception power as the result of measurement by the node B 102 corresponds to the desired signal level, and reception powers as the results of measurement by the node C 103 and the node D 104 correspond to the interference signal level. Similarly, in SP2, the node D 104 transmits a radio signal, so a reception power as the result of measurement by the node C 103 corresponds to the desired signal level, and reception powers as the results of measurement by the node A 101 and the node B 102 correspond to the interference signal level.

In this case, the radio quality can be calculated by the ratio of the desired signal level and the interference signal level. The radio quality in this case is given by:

$$SIR_n = S_{S\text{-}D}/In_{S\text{-}D} \quad (1)$$

where $SIR_n$ is the radio quality corresponding to radio transmission in the nth SP. For example, $SIR_1$ corresponds to an SIR when a signal regarding SP2 is spatially separated and transmitted in parallel in regard to radio transmission from the node A to the node B to which SP1 is allocated. For example, $SIR_2$ corresponds to an SIR when a signal regarding SP1 is spatially separated and transmitted in parallel in regard to radio transmission from the node D to the node C to which SP2 is allocated. $S_{S\text{-}D}$ is the desired signal level regarding a signal transmitted from a transmission node S to a destination reception node D, and $In_{S\text{-}D}$ is the interference signal level regarding a signal transmitted from the transmission node S to the destination reception node D. Note that the radio quality at this time is SIR (Signal to Interference power Ratio), but another index representing the quality, such as SINR or CIR, may be used.

After obtaining the radio quality information (step S602), the control node 100 determines whether signals regarding SP1 and SP2 can be transmitted in parallel by spatial multiplexing (step S603). The control node 100 looks up a table in which a necessary SIR is associated with at least either of the above-mentioned modulation scheme and coding rate. The control node 100 compares a calculated radio quality with the necessary SIR corresponding to at least either of the modulation scheme and coding rate currently used in each SP, and determines whether spatial multiplexing of a signal regarding SP1 and a signal regarding SP2 is possible.

If the radio qualities of both a signal regarding SP1 and a signal regarding SP2 at the time of spatial multiplexing exceed a desired SIR level, the control node 100 determines that spatial multiplexing can be executed (YES in step S604), and advances the process to step S607. If the radio quality of at least either of a signal regarding SP1 and a signal regarding SP2 at the time of spatial multiplexing does not satisfy the desired SIR level (NO in step S604), the control node 100 advances the process to step S605.

In step S605, the control node 100 compares the communication period lengths of SP1 and SP2. When the difference between the communication period lengths is smaller than a predetermined length, that is, when SP1 and SP2 have almost the same communication period lengths, the probability that a signal regarding SP with a radio quality not satisfying the level can be communicated by extending the communication period length is considered to be low. Thus, in this case (NO in step S605), the control node 100 determines that spatial multiplexing cannot be executed, and performs control to temporally separate and transmit signals regarding SP1 and SP2. That is, for example, when resource allocation in the DTI 201 as shown in FIG. 2 is performed, the control node 100 maintains this allocation. If the difference between the communication period lengths is equal to or larger than a predetermined length (YES in step S605), the control node 100 extends the communication period length of SP (SP2 here) having a smaller communication period length (step S606). This is performed by, for example, changing at least either of the modulation scheme and coding rate. This may be performed by copying at least part of a signal regarding SP having a smaller communication period length. Note that copying can improve the reception performance when, for example, performing maximum-likelihood decoding in a reception node. Note that when the extended communication period length becomes equal to or larger than the communication period length of SP1 (or becomes equal to or larger than the total length of the communication period lengths of SP1 and SP2), the control node 100 may determine that spatial multiplexing cannot be executed, and end the process. That is, the control node 100 extends the communication period length of SP2 in the range of smaller than the communication period length of SP1 (or in the range of smaller than the total length of the communication period lengths of SP1 and SP2). After that, the control node 100 executes again determination of whether spatial multiplexing can be executed when SP2 having the extended communication period length is used (steps S603 and S604). For example, the control node 100 compares a calculated radio quality with a necessary SIR that has been changed along with extension of the communication period length and corresponds to the modulation scheme, and determines whether spatial multiplexing can be executed.

In step S607, the control node 100 executes rescheduling in the DTI 201 so as to spatially multiplex SP1 and SP2. The control node 100 then notifies the nodes 101 to 104 of the configuration of the DTI 201 after rescheduling (step S608).

Subsequently, the sequence of processing of the overall radio communication system in operation example 1 will be explained with reference to the sequence chart of FIGS. 7A and 7B. Assume that resource allocation in the DTI 201 as shown in FIG. 2 has been performed before the start of processing in the sequence chart of FIGS. 7A and 7B. First, the control node 100 notifies the nodes 101 to 104 of a signal reception power measurement request (step S700), and the nodes 101 to 104 receive the signal reception power measurement request (steps S701 to S704). At this time, the nodes 101 to 104 may transmit ACK (acknowledgement) to the control node 100 in order to notify the control node 100 that this request has been received.

At this time, for example, the resource allocation as shown in FIG. 2 has been performed. The node A 101 transmits a radio signal to the node B 102 in SP1 (step S705), and the nodes 102 to 104 measure the reception power of this radio signal (steps S706 to S708). The node B 102 can also perform normal data reception at the same time (step S706). Then, the node D 104 transmits a radio signal addressed to the node C 103 in SP2 (step S709), and the remaining nodes 101 to 103 measure the reception power of this radio signal (steps S710 to S712). In this case, the transmission direction of a signal in SP is one direction, and the above-described processing is information collection for determining whether spatial multiplexing of signals regarding SP1 and SP2 can be executed. Thus, measurement of only the reception powers of radio signals regarding SP1 and SP2 is performed in only one direction. However, when there is a possibility of performing spatial multiplexing of a signal regarding another SP, measurement of the radio signals of signals regarding this SP and still another SP may be performed, or measurement of the reception power may be performed in regard to two-way communication in SP.

The node B 102 and node C 103 respectively serving as reception nodes in SP1 and SP2 notify the control node 100 of the measured reception powers (steps S713 and S714). Based on the notified reception power measurement results, the control node 100 calculates radio qualities (for example, SIRs) in SP1 and SP2 on the premise of spatial multiplexing. Note that the node B 102 and the node C 103 may calculate, from the measured reception powers, radio qualities regarding SP1 and SP2 at the time of spatial multiplexing, and transmit the calculation results to the control node 100.

Based on the obtained radio quality information, the control node 100 determines whether spatial multiplexing is possible (step S715). For example, the control node 100 compares the value of each obtained radio quality with the value of a necessary SIR corresponding to the current modulation scheme and coding rate in the above-mentioned table, and determines whether spatial multiplexing is possible. Assume that the control node 100 determines that the radio quality in SP2 is lower than the necessary SIR.

Then, the control node 100 compares the difference between the communication period lengths of SP1 and SP2. If the difference is equal to or larger than a predetermined length, the control node 100 extends the communication period length of SP2 having a smaller communication period length, and reconfigures SP2 (step S716). This reconfiguration is performed by changing at least either of the modulation scheme and coding rate. This reconfiguration may be performed by copying at least part of a signal regarding SP having a smaller communication period length.

Thereafter, the control node 100 determines again whether the obtained radio quality satisfies the level capable of communication thanks to the extension of the communication period length (step S717). Assume that the obtained radio quality exceeds the SIR necessary for the modulation scheme after changing the modulation scheme of a signal regarding SP2. As a result, the control node 100 performs rescheduling in the DTI 201 so as to spatially separate a signal regarding SP1 and a signal regarding SP2 having the extended communication period length by spatial multiplexing, and transmit them in parallel. The control node 100 notifies the nodes 101 to 104 of the rescheduling result. The nodes 101 to 104 perform data communication by the resource allocation notified by the control node 100 (step S719).

Figure 8:
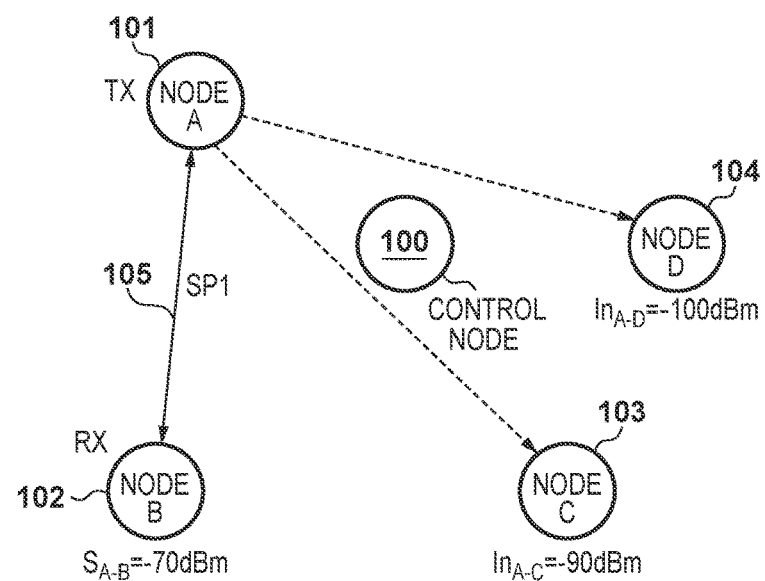
FIG. 8 is a conceptual view showing the state of measurement of the reception power of a signal in SP1 in operation example 1.

Subsequently, a concrete example of the operation of the radio communication system will be explained with reference to schematic views (FIGS. 8 to 13). First, as described above, the control node 100 requests measurement of signals in SP1 and SP2 of the nodes 101 to 104. In response to this, the node A 101 transmits a radio signal in SP1, and the node B 102 to node D 104 measure the reception power of this radio signal. FIG. 8 is a conceptual view showing the state of measurement at this time. FIG. 8 shows that the radio signal from the node A 101 is received at −70 dBm in the node B 102, −90 dBm in the node C 103, and −100 dBm in the node D 104.

Although not shown in drawings used in the following description, including FIG. 8, the node A 101 transmits a signal using an antenna of directivity characteristics corresponding to the position of the node B 102, and the node B 102 similarly receives a signal using an antenna of directivity characteristics corresponding to the position of the node A. Therefore, the power level of a transmission signal can be suppressed by the antenna in directions other than a direction in which the antenna gain is large, such as the main lobe direction of the node A 101. Also, in the node C 103 and the node D 104, a signal from the node A 101 can be received by an antenna of directivity characteristics used in communication between the node C 103 and the node D 104, and the reception power of the signal can also be suppressed. At this time, the node B 102 can perform data communication using the radio signal transmitted by the node A 101, and measure the reception power. The radio signal from the node A 101 is a desired signal in the node B 102, and the node B 102 stores the reception level (−70 dBm) of this radio signal as a desired signal level ($S_{A-B}$ in equation (1)). In the node C 103 and the node D 104, the radio signal from the node A 101 is an interference signal. The node C 103 and the node D 104 store the reception levels (−90 dBm and −100 dBm, respectively) of this radio signal as interference signal levels ($In_{A-C}$ and $In_{A-D}$ in equation (1)).

Figure 9:
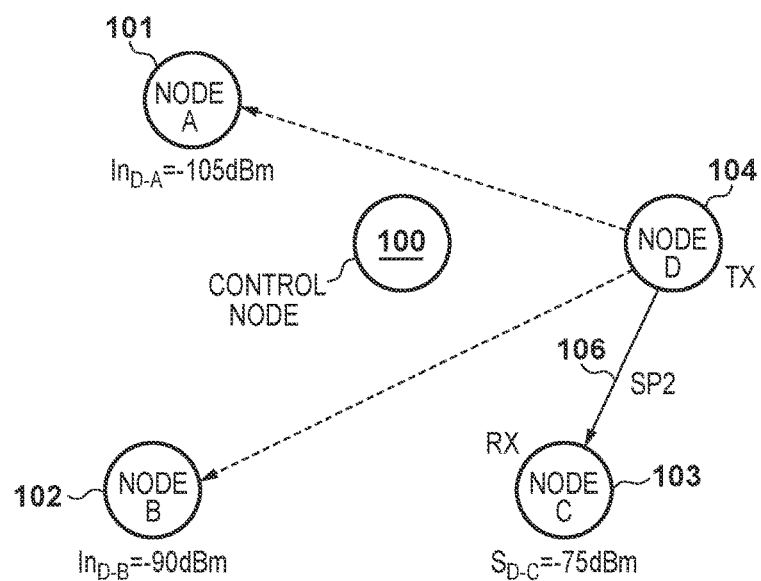
FIG. 9 is a conceptual view showing the state of measurement of the reception power of a signal in SP2 in operation example 1.

Subsequently, the node D 104 transmits a radio signal in SP2, and the node A 101 to node C 103 measure the reception power of this radio signal. FIG. 9 is a conceptual view showing the state of measurement at this time. FIG. 9 shows that the radio signal from the node D 104 is received at −105 dBm in the node A 101, −90 dBm in the node B 102, and −75 dBm in the node C 103. At this time, the node C 103 can perform data communication using the radio signal transmitted by the node D 104, and measure the reception power. The radio signal from the node D 104 is a desired signal in the node C 103, and the node C 103 stores the reception level (−75 dBm) of this radio signal as a desired signal level ($S_{D-C}$ in equation (1)). In the node A 101 and the node B 102, the radio signal from the node D 104 is an interference signal. The node A 101 and the node B 102 store the reception levels (−105 dBm and −90 dBm, respectively) of this radio signal as interference signal levels ($In_{D-A}$ and $In_{D-B}$ in equation (1)).

These measurement results are reported to the control node 100 from the node B 102 and node C 103 respectively serving as reception nodes in SP1 and SP2. Note that the node B 102 and the node C 103 may notify the control node 100 of not measurement results, but radio qualities (SIRs) calculated from the measurement results. At this time, since the desired signal level is −70 dBm and the interference signal level is −90 dBm, the SIR on the premise of spatial multiplexing of signals regarding SP1 and SP2 in the node B 102 is $SIR_1=20$ dB. To the contrary, since the desired signal level is −75 dBm and the interference signal level is −90 dBm, the SIR on the premise of spatial multiplexing of signals regarding SP1 and SP2 in the node C 103 is $SIR_2=15$ dB. Note that the calculation of the radio quality may be performed in any of the control node 100 and reception nodes in SP1 and SP2.

After obtaining the radio quality information, the control node 100 determines, by looking up the table, whether the value of the radio quality satisfies a necessary SIR corresponding to the currently used modulation scheme. FIG. 10 shows an example of this table. As described above, the control node 100 stores an SIR necessary for each modulation scheme as a table as shown in FIG. 10. The SIR necessary for each modulation scheme can be calculated and determined in advance from, for example, BER (Bit Error Rate) requested of communication. As is apparent from FIG. 10, when the radio quality is 7 dB for SP in which QPSK is used, the SIR necessary for QPSK is 8.6 dB, and no desired BER can be achieved. Although only the modulation scheme is considered in FIG. 10, another element such as the coding rate or the diffusivity may be considered. That is, for example, when the modulation scheme is BPSK and the coding rate is, for example, ½ or ⅓, each necessary SIR value may be stored in the table.

Figure 11:
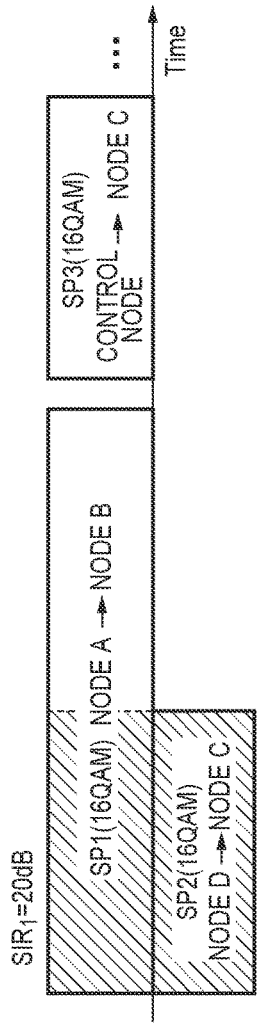
FIG. 11 is a view showing an example of the arrangement of SP1 and SP2 and the radio quality on the premise of spatial multiplexing.

FIG. 11 shows an example of the arrangement of SP1 and SP2 and the radio quality on the premise of spatial multiplexing. Assume that 16QAM was used as the modulation scheme for signals regarding SP1 and SP2 before performing spatial multiplexing. The radio quality $SIR_1$ of a signal regarding SP1 in a period in which the signal regarding SP1 is transmitted in parallel to a signal regarding SP2 is 20 dB. The radio quality $SIR_2$ of a signal regarding SP2 in a period in which the signal regarding SP2 is transmitted in parallel to a signal regarding SP1 is 15 dB.

At this time, the above-described table that associates a modulation scheme with an SIR reveals that a 15.6-dB SIR is necessary in 16QAM. The $SIR_1$ of a signal regarding SP1 is 20 dB, and a satisfactory radio quality has been obtained. Thus, a signal regarding SP1 can be communicated at an error rate of desired BER or less. In contrast, the $SIR_2$ of a signal regarding SP2 is 15 dB, which is lower than 15.6 dB. In the case of spatial multiplexing with a signal regarding SP1, it is predicted that an error rate of desired BER or less cannot be achieved for a signal regarding SP2. For this reason, the control node 100 tries to lower the modulation level of the modulation scheme by extending the communication period length for a signal regarding SP2 having a smaller communication period length so that the radio quality of the signal regarding SP2 satisfies a level for achieving the error rate of desired BER or less.

Figure 12:
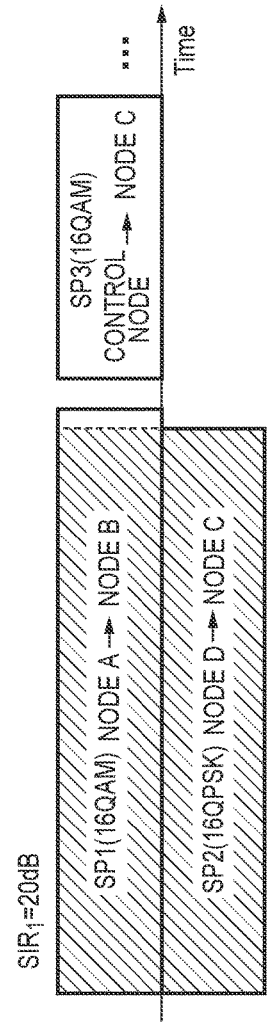
FIG. 12 is a view showing an example of a case in which the communication period length of SP2 is extended to lower the level of a radio quality requested of a signal regarding SP2.

FIG. 12 shows an example of a case in which the communication period length of SP2 is extended to lower the level of a radio quality requested of a signal regarding SP2. In FIG. 11, the communication period length of SP1 is assumed to be double or more the communication period length of SP2. The control node 100 changes the modulation scheme of a signal regarding SP2 from 16QAM to QPSK. Information of 4 bits per symbol is transmitted in 16QAM, whereas information of 2 bits per symbol is transmitted in QPSK. When changing the modulation scheme to be used from 16QAM to QPSK, double the number of symbols is necessary for transmitting the same amount of data. Since the modulation scheme is changed from 16QAM to QPSK in transmitting the same amount of data, the communication period length of a signal regarding SP2 becomes almost double the original communication period length. Along with the change of the modulation scheme to QPSK, the necessary SIR for a signal regarding SP2 is decreased to 8.6 dB. Since the radio quality $SIR_2$ regarding the obtained SP2 at the time of spatial multiplexing is 15 dB, communication becomes possible with a satisfactory radio quality. The control node 100 therefore determines that spatial multiplexing can be performed by extending the communication period length of SP2, and executes rescheduling in the DTI 201. The nodes 101 to 104 perform data communication using resources rescheduled and allocated so that a signal regarding SP1 and a signal regarding SP2 are spatially multiplexed. In this manner, the probability that spatial multiplexing is executed can be increased using resources that are wasted on the time axis when performing spatial multiplexing. The frequency utilization efficiency of the overall radio communication system can be increased.

Figure 13:
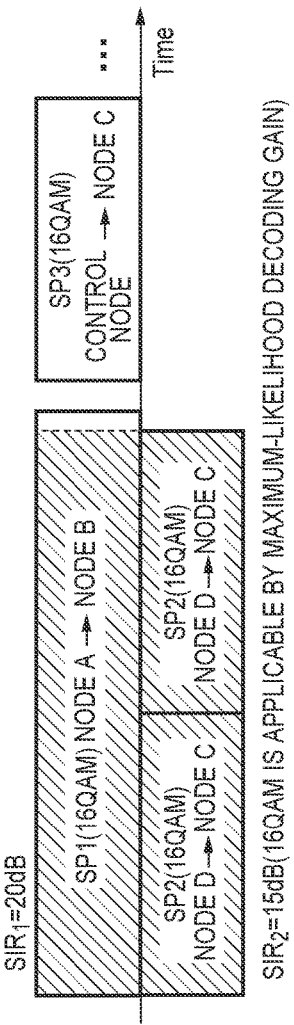
FIG. 13 is a view showing another example of the case in which the communication period length of SP2 is extended to lower the level of a radio quality requested of a signal regarding SP2.

When extending the communication period length of a signal having a smaller communication period length, the modulation scheme need not always be changed as shown in FIG. 12. FIG. 13 shows another example of the case in which the communication period length of SP2 is extended to lower the level of a radio quality requested of a signal regarding SP2. FIG. 13 shows an example of a case in which an entire signal regarding SP2 is copied to perform redundant transmission twice, in order to relax the level of a radio quality requested of a signal regarding SP2. At this time, the gain is obtained by maximum-likelihood decoding or the like using data received twice in the node C 103 serving as the reception node of a signal regarding SP2. Assuming that the gain at this time is 2 dB, an SIR necessary to use 16QAM is 15.6 dB in the above-mentioned table in which a necessary SIR is associated with each modulation scheme. However, this SIR reference value can be decreased by the 2-dB gain by maximum-likelihood decoding. That is, a signal is copied and transmitted, and the SIR necessary to use 16QAM can be lowered to 13.6 dB by using maximum-likelihood decoding. The $SIR_2$ is 15 dB, which exceeds the 13.6-dB SIR reference value considering the maximum-likelihood decoding gain, so communication can be performed with a satisfactory radio quality. The control node 100 can therefore determine that spatial multiplexing is possible by copying a signal regarding SP2 and extending the communication period length of SP2. In copying a signal, the entire signal may be copied, as described above, or part of it may be copied. At least part or all of a signal may be copied not only twice but three or more times. The number of times of copying may differ between part and another part of a signal. That is, part of a signal may be copied twice, and the remaining part may be copied three times. Therefore, the extended communication period length can be very flexibly changed for a signal having a small communication period length.

Operation Example 2

In operation example 1, a method has been explained, in which the communication period length of SP2 having a smaller communication period length is extended to improve the radio quality of a signal regarding SP2 with an unsatisfactory radio quality and increase the probability that spatial multiplexing is performed. In operation example 2, a method will be explained, in which, when the radio quality of a signal regarding SP1 is unsatisfactory, the radio quality is improved to increase the probability that spatial multiplexing is performed.

Figure 14:
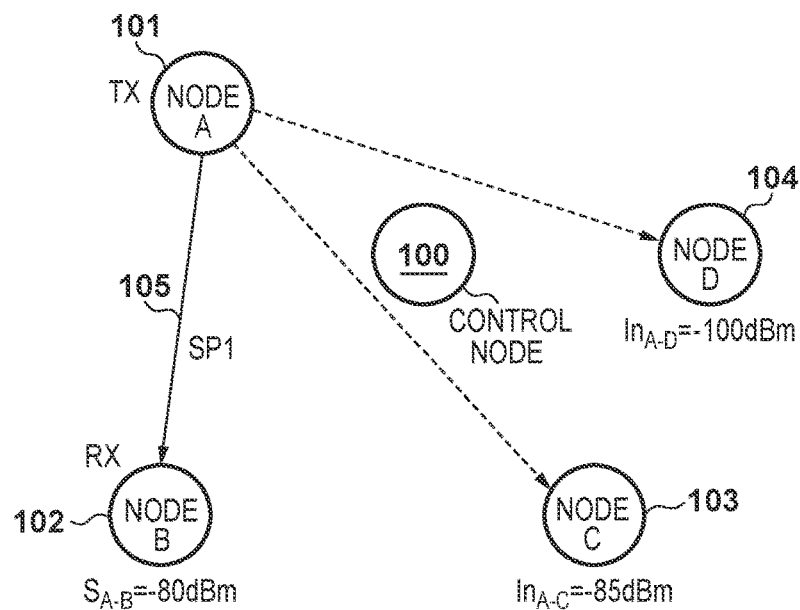
FIG. 14 is a conceptual view showing the state of measurement of the reception power of a signal in SP1 in operation example 2.

FIG. 14 is a conceptual view showing the state of measurement of the reception power of a signal in SP1 in operation example 2. As in FIG. 8, FIG. 14 shows that a radio signal from the node A 101 is received at −80 dBm in the node B 102, −85 dBm in the node C 103, and −100 dBm in the node D 104. The radio signal from the node A 101 is a desired signal in the node B 102, and the node B 102 stores the reception level (−80 dBm) of this radio signal as a desired signal level ($S_{A-B}$ in equation (1)). In the node C 103 and the node D 104, the radio signal from the node A 101 is an interference signal. The node C 103 and the node D 104 store the reception levels (−85 dBm and −100 dBm, respectively) of this radio signal as interference signal levels ($In_{A-C}$ and $In_{A-D}$ in equation (1)).

Figure 15:
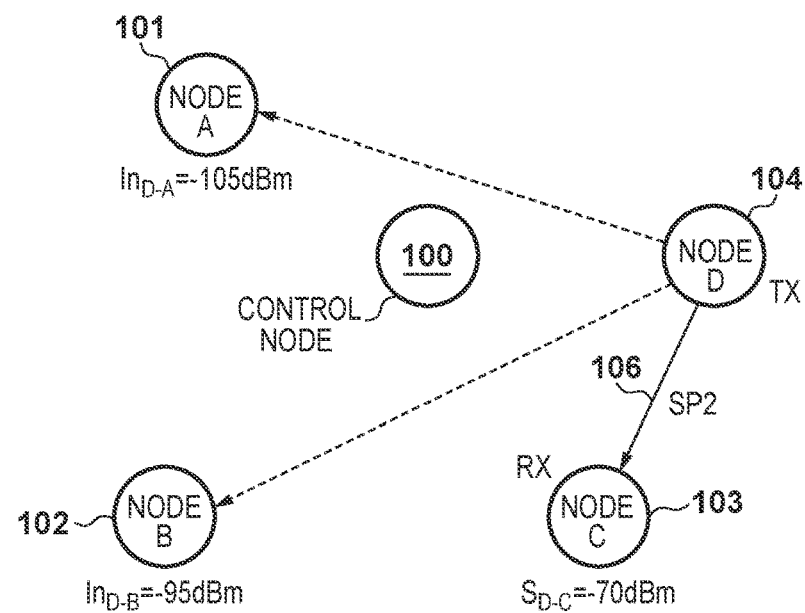
FIG. 15 is a conceptual view showing the state of measurement of the reception power of a signal in SP2 in operation example 2.

FIG. 15 is a conceptual view showing the state of measurement of the reception power of a signal in SP2 in operation example 2. As in FIG. 9, FIG. 15 shows that the radio signal from the node D 104 is received at −105 dBm in the node A 101, −95 dBm in the node B 102, and −70 dBm in the node C 103. The radio signal from the node D 104 is a desired signal in the node C 103, and the node C 103 stores the reception level (−70 dBm) of this radio signal as a desired signal level ($S_{D-C}$ in equation (1)). In the node A 101 and the node B 102, the radio signal from the node D 104 is an interference signal. The node A 101 and the node B 102 store the reception levels (−105 dBm and −95 dBm, respectively) of this radio signal as interference signal levels ($In_{D-A}$ and $In_{D-B}$ in equation (1)).

Accordingly, the radio quality $SIR_1$ of a signal regarding SP1 in a period in which the signal regarding SP1 is transmitted in parallel to a signal regarding SP2 is 15 dB, and the radio quality $SIR_2$ of a signal regarding SP2 in a period in which the signal regarding SP2 is transmitted in parallel to a signal regarding SP1 is also 15 dB. At this time, the above-described table in FIG. 10 that associates a modulation scheme with an SIR reveals that a 15.6-dB SIR is necessary in 16QAM, but neither the $SIR_1$ nor the $SIR_2$ satisfies this reference. The control node 100 determines that spatial multiplexing cannot be executed if nothing is done, and the control node 100 extends the communication period length of SP2 having a smaller communication period length. For example, assume that the modulation scheme of a signal regarding SP2 is changed from 16QAM to QPSK along with extension of the communication period length.

Figure 16:
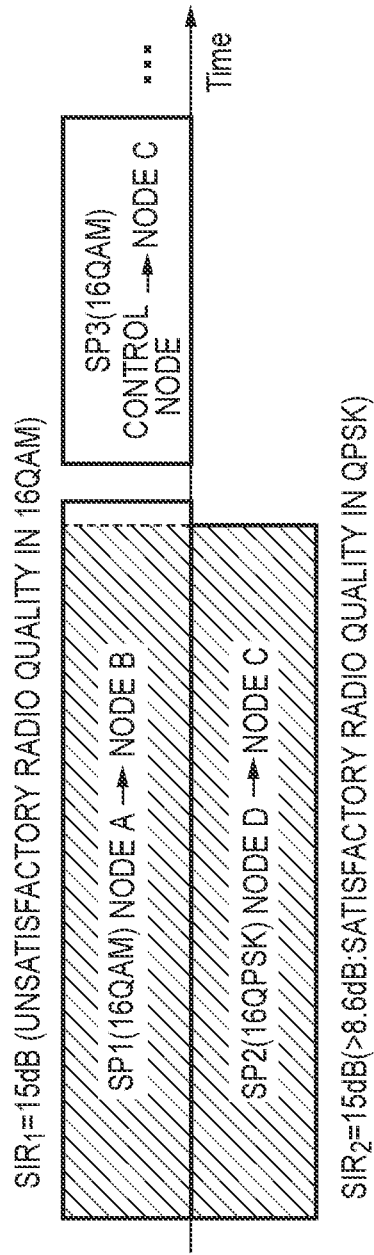
FIG. 16 is a view showing an example of a case in which the communication period length of SP2 is extended to lower the level of a radio quality requested of a signal regarding SP2.

FIG. 16 shows an example of a case in which the communication period length of SP2 is extended to lower the level of a radio quality requested of a signal regarding SP2. At this time, the $SIR_2$ is 15 dB, which exceeds the 8.6-dB SIR level necessary for QPSK, so a signal regarding SP2 is considered to achieve desired BER even after spatial multiplexing. In contrast, a signal regarding SP1 still does not satisfy the SIR level (15.6 dB) at which desired BER can be achieved. As for a signal regarding SP2, its radio quality is 15 dB, which greatly exceeds the SIR level (8.6 dB) at which desired BER can be achieved. It is therefore considered that, even if the transmission power is lowered (only by a maximum of 6.4 dB) as long as the transmission power does not become lower than its level, a signal regarding SP2 can satisfy the SIR level at which desired BER can be achieved. When the transmission power of a signal regarding SP2 is lowered, the interference power to a signal regarding SP1 is decreased to improve the radio quality of a signal regarding SP1. In the state of FIG. 16, the SIR value of a signal regarding SP1 is smaller by 0.6 dB than the SIR value necessary for 16QAM. It is considered that the SIR value of a signal regarding SP1 will reach the SIR value necessary for 16QAM by lowering the transmission power of a signal regarding SP2 by 0.6 dB or more.

Figure 17:
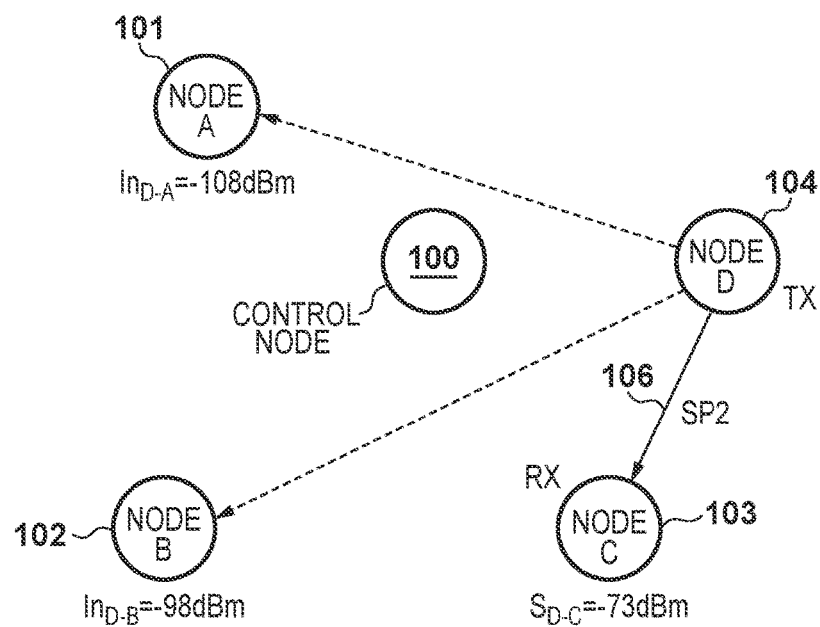
FIG. 17 is a conceptual view showing the state of measurement of the reception power of a signal when the transmission power of a signal regarding SP2 is lowered in operation example 2.

FIG. 17 shows the value of the reception power of a signal in SP2 (predicted to be) observed when the transmission power of a signal regarding SP2 is lowered by 3 dB, in order to improve the radio quality of a signal regarding SP1. In this case, the transmission power of a signal regarding SP2 is reduced by 3 dB. However, the reduction amount of the transmission power of a signal regarding SP2 may be freely selected as long as SIR conditions necessary for signals regarding SP1 and SP2 are satisfied. The control node 100 notifies the nodes 101 to 104 of transmission power information by using a predetermined signal such as a beacon, in order to perform the determined transmission power control.

In FIG. 17, as a result of lowering the transmission power of a signal regarding SP2 by 3 dB, the reception powers of signals in the node A 101 to node C 103 become −108 dBm, −98 dBm, and −73 dBm, respectively. As a result, the radio quality of a signal regarding SP1 in the node B 102 becomes 18 dB from (−80 dBm−(−98 dBm)). Similarly, the radio quality of a signal regarding SP2 in the node C 103 becomes 12 dB from (−73 dBm−(−85 dBm)). FIG. 18 shows this state.

By extending the communication period length of SP2 and lowering the transmission power, as shown in FIG. 18, a signal regarding SP2 can satisfy an SIR level requested of QPSK while a signal regarding SP1 satisfies an SIR level requested of 16QAM. Even in this case, a margin for lowering the transmission power of a signal regarding SP2 can be generated by copying at least part of a signal regarding SP2 and lowering a requested SIR level, as described above, and the radio quality of a signal regarding SP1 can be improved. In this operation example, the communication period length of a signal regarding SP2 is extended to control the transmission power by using a resource not used at the time of spatial multiplexing. Both signals regarding SP1 and SP2 can ensure radio qualities necessary at the time of spatial multiplexing. The probability that spatial multiplexing can be performed can be increased, and the frequency utilization efficiency of the overall radio communication system can be increased.

Note that the above-described embodiment has explained a case in which one transmission node and one reception node that perform communication in parallel in spatial multiplexing are set for each SP. However, the present invention is not limited to this. For example, both signals regarding SP1 and SP2 may be transmitted from one transmission node or received by one reception node. For example, when transmitting both moving image data and audio data from the first node to the second node, the moving image data and the audio data can be spatially separated and transmitted via different communication paths. In this case, audio data is generally smaller in size than moving image data, and the difference between communication period lengths when they do not interfere with each other tends to be large. Even when two communication links for transmitting moving image data and audio data interfere with each other, the possibility that these data can be spatially separated and communicated in parallel can be increased by performing the above-described control.

The present invention increases the frequency utilization efficiency by effectively using the space and time resources based on the communication quality in a radio communication system that performs spatial multiplexing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-001074, filed Jan. 6, 2015, which is hereby incorporated by reference herein in its entirety.

What is claimed is:

1. A control apparatus comprising:
   at least one processor; and
   at least one memory storing code to be executed by the at least one processor, wherein the at least one processor executes the code to function as:
   an obtaining unit configured to obtain a first radio quality regarding a first signal and a second radio quality regarding a second signal when spatially separating and transmitting the first signal of a first communication period length and the second signal of a second communication period length, wherein the first radio quality and the second radio quality are obtained in parallel;
   a determination unit configured to determine whether the first radio quality satisfies a first level for transmitting the first signal in the first communication period length and whether the second radio quality satisfies a second level for transmitting the second signal in the second communication period length;
   a comparison unit configured to compare the first communication period length with the second communication period length to obtain a difference between the first communication period length and the second communication period length; and
   a control unit configured to, in a case where at least one of the first radio quality or the second radio quality does not satisfy the corresponding first level or the second level and the difference between the first communication period length and the second communication period length is not smaller than a predetermined length, perform control of extending the communication period length of a signal having a smaller communication period length out of the first signal and the second signal by lowering a coding rate of the signal having the smaller communication period length so as to transmit, in the extended communication period length, the same amount of data as data of the signal having the smaller communication period length in the communication period length before extension.

2. The apparatus according to claim 1, wherein when the second communication period length is smaller than the first communication period length and the second radio quality does not satisfy the second level, the control unit is further configured to perform control of selecting a coding rate corresponding to a third level satisfied by the second radio quality, and extending the communication period length of the second signal using the selected coding rate.

3. The apparatus according to claim 1, wherein the control unit is further configured to perform control of copying at least part of data included in the signal having the smaller communication period length, and extending the communication period length of the signal having the smaller communication period length.

4. The apparatus according to claim 1, wherein when the second communication period length is smaller than the first communication period length and the first radio quality does not satisfy the first level, the control unit is further configured to perform control of extending the communication period length of the second signal and lowering power of the second signal so as to make the first radio quality satisfy the first level.

5. The apparatus according to claim 1, wherein the control unit is further configured to perform control of extending the communication period length of the signal having the smaller communication period length in a range of not exceeding the communication period length of the signal having a larger communication period length.

6. The apparatus according to claim 1, wherein the control unit is further configured to perform control of extending the communication period length of the signal having the smaller communication period length in a range of smaller than a total length of the communication period length of the signal having the larger communication period length and the communication period length of the signal having the smaller communication period length.

7. The apparatus according to claim 6, wherein the control unit is further configured to perform control of extending the communication period length of the signal having the larger communication period length in a range of smaller than the total length.

8. The apparatus according to claim 1, wherein the at least one processor further executes the code to function as a transmission unit configured to transmit at least one of the first signal and the second signal.

9. The apparatus according to claim 1, wherein the control unit includes a notification unit configured to notify a transmission device configured to transmit at least one of the first signal and the second signal, of information for controlling the signal to be transmitted.

10. The apparatus according to claim 1, wherein the obtaining unit includes a measurement unit configured to measure at least one of the first radio quality and the second radio quality.

11. The apparatus according to claim 1, wherein the obtaining unit is further configured to obtain radio quality information about a signal to be received, from a reception device configured to receive at least one of the first radio quality and the second radio quality.

12. The apparatus according to claim 1, wherein the first communication period length is a communication period length taken to transmit data regarding the first signal when an interference from the second signal does not exist, and the second communication period length is a communication period length taken to transmit data regarding the second signal when an interference from the first signal does not exist.

13. A control apparatus comprising:
   at least one processor; and
   at least one memory storing code to be executed by the at least one processor, wherein the at least one processor executes the code to function as:
      an obtaining unit configured to obtain a first radio quality regarding a first signal and a second radio quality regarding a second signal when spatially separating and transmitting the first signal and the second signal, wherein the first radio quality and the second radio quality are obtained in parallel;
      a control unit configured to control a first communication period length of the first signal and a second communication period length of the second signal so as to make the first radio quality satisfy a first level for transmitting the first signal, and the second radio quality satisfy a second level for transmitting the second signal; and
      a comparison unit configured to compare the first communication period length with the second communication period length to obtain a difference between the first communication period length and the second communication period length,
      wherein, in a case where at least one of the first radio quality or the second radio quality does not satisfy the corresponding first level or the second level and the difference between the first communication period length and the second communication period length is not smaller than a predetermined length, the control unit is configured to perform control of extending the communication period length of a signal having a smaller communication period length out of the first signal and the second signal by lowering a coding rate of the signal having the smaller communication period length so as to transmit, in the extended communication period length, the same amount of data as data of the signal having the smaller communication period length in the communication period length before extension.

14. The apparatus according to claim 13, wherein the obtaining unit is further configured to obtain the first radio quality and the second radio quality based on a result of measuring, in a third device configured to receive the first signal and a fourth device configured to receive the second signal, a first predetermined signal transmitted from a first device configured to transmit the first signal and a second predetermined signal transmitted from a second device configured to transmit the second signal.

15. A control method in a control apparatus that controls a communication period length of a signal transmitted by radio, the control method comprising:
   obtaining, in parallel, a first radio quality regarding a first signal and a second radio quality regarding a second signal when spatially separating and transmitting the first signal of a first communication period length and the second signal of a second communication period length;
   determining whether the first radio quality satisfies a first level for transmitting the first signal in the first communication period length and whether the second radio quality satisfies a second level for transmitting the second signal in the second communication period length;
   comparing the first communication period length with the second communication period length to obtain a difference between the first communication period length and the second communication period length; and
   performing, in a case where at least one of the first radio quality or the second radio quality does not satisfy the corresponding first level or the second level and the difference between the first communication period length and the second communication period length is not smaller than a predetermined length, control of extending the communication period length of a signal having a smaller communication period length out of the first signal and the second signal by lowering a coding rate of the signal having the smaller communication period length so as to transmit, in the extended communication period length, the same amount of data as data of the signal having the smaller communication period length in the communication period length before extension.

16. A control method in a control apparatus that controls a communication period length of a signal transmitted by radio, the control method comprising:
   obtaining, in parallel, a first radio quality regarding a first signal and a second radio quality regarding a second signal when spatially separating and transmitting the first signal and the second signal;
   comparing a first communication period length of the first signal with a second communication period length of the second signal to obtain a difference between the first communication period length and the second communication period length; and
   controlling the first communication period length of the first signal and the second communication period length of the second signal so as to make the first radio quality satisfy a first level for transmitting the first signal, and the second radio quality satisfy a second level for transmitting the second signal by performing, in a case where at least one of the first radio quality or the second radio quality does not satisfy the corresponding first level or the second level and the difference between the first communication period length and the second communication period length is not smaller than a predetermined length, control of extending the communication period length of a signal having a smaller communication period length out of the first signal and the second signal by lowering a coding rate of the signal having the smaller communication period length so as to transmit, in the extended communication period length, the same amount of data as data of the signal having the smaller communication period length in the communication period length before extension.

17. A non-transitory computer-readable storage medium storing a computer program for causing a computer arranged in a control apparatus that controls a communication period length of a signal transmitted by radio to:
   obtain, in parallel, a first radio quality regarding a first signal and a second radio quality regarding a second signal when spatially separating and transmitting the first signal of a first communication period length and the second signal of a second communication period length;
   determine whether the first radio quality satisfies a first level for transmitting the first signal in the first communication period length and whether the second radio quality satisfies a second level for transmitting the second signal in the second communication period length;

compare the first communication period length with the second communication period length to obtain a difference between the first communication period length and the second communication period length; and perform, in a case where at least one of the first radio quality or the second radio quality does not satisfy the corresponding first level or the second level and the difference between the first communication period length and the second communication period length is not smaller than a predetermined length, control of extending the communication period length of a signal having a smaller communication period length out of the first signal and the second signal by lowering a coding rate of the signal having the smaller communication period length so as to transmit, in the extended communication period length, the same amount of data as data of the signal having the smaller communication period length in the communication period length before extension.

18. A non-transitory computer-readable storage medium storing a computer program for causing a computer arranged in a control apparatus that controls a communication period length of a signal transmitted by radio to:

obtain, in parallel, a first radio quality regarding a first signal and a second radio quality regarding a second signal when spatially separating and transmitting the first signal and the second signal;

compare a first communication period length of the first signal with a second communication period length of the second signal to obtain a difference between the first communication period length and the second communication period length; and control the first communication period length of the first signal and the second communication period length of the second signal so as to make the first radio quality satisfy a first level for transmitting the first signal, and the second radio quality satisfy a second level for transmitting the second signal by performing, in a case where at least one of the first radio quality or the second radio quality does not satisfy the corresponding first level or the second level and the difference between the first communication period length and the second communication period length is not smaller than a predetermined length, control of extending the communication period length of a signal having a smaller communication period length out of the first signal and the second signal by lowering a coding rate of the signal having the smaller communication period length so as to transmit, in the extended communication period length, the same amount of data as data of the signal having the smaller communication period length in the communication period length before extension.

* * * * *